Aug. 6, 1940.  M. C. TWITCHELL  2,210,224
CENTRALIZED TRAFFIC CONTROLLING SYSTEM FOR RAILROADS
Filed Jan. 18, 1939  4 Sheets-Sheet 1

INVENTOR.
M. C. Twitchell,
BY Neil D. Ralston,
his ATTORNEY.

Fig. 2.

Aug. 6, 1940.  M. C. TWITCHELL  2,210,224
CENTRALIZED TRAFFIC CONTROLLING SYSTEM FOR RAILROADS
Filed Jan. 18, 1939  4 Sheets-Sheet 3

INVENTOR.
M. C. Twitchell,
BY Neil D. Preston,
his ATTORNEY.

Patented Aug. 6, 1940

2,210,224

UNITED STATES PATENT OFFICE 2,210,224

CENTRALIZED TRAFFIC CONTROLLING SYSTEM FOR RAILROADS

Morton C. Twitchell, Spencerport, N. Y., assignor to General Railway Signal Company, Rochester, N. Y.

Application January 18, 1939, Serial No. 251,523

14 Claims. (Cl. 246—3)

This invention relates to centralized traffic controlling systems for railroads, and it more particularly pertains to optional stick and non-stick control of signals in such a system of the code communication type.

In code type centralized traffic controlling systems for railroads, a control machine is located in a control office for governing, by the transmission of control codes through various cycles of operation of the system, track switches and signals remotely located from the control office. Those track switches and signals located relatively near to each other, together with the field apparatus for their control, constitute a field station. In one type of system the field stations are connected by a control line circuit with the control office for the purpose of communicating controls from the control office to the various devices in the field, and also by an indication line circuit for the purpose of communicating indications from the field stations to the control office of the condition of the various devices in the field, and the condition of occupancy of the various track sections. However, the same line circuit can be used for the transmission of both controls and indications dependent upon the particular type of communication system employed. Thus, the present invention can be applied to different types of communication systems, such, for example, as the system shown in the patent to Judge et al., Patent No. 2,082,544, dated June 1, 1937, and the system shown in the prior application of Hailes and Brixner, Ser. No. 197,204, filed March 22, 1938, the first of which has been chosen for the purposes of present disclosure.

To simplify the manipulation of a control machine, it is of a particular advantage to provide control of the signals in such a manner that the same route used for a number of following trains can be set up automatically for each approaching train after the preceding train leaves the detector track section. Such a condition causes the signals to be "non-stick"; that is, each signal is restored to stop when a train accepts that signal, but is automatically cleared again for a following train when the detector track section becomes unoccupied and traffic conditions are safe. It is assumed, of course, that suitable block signalling is employed to properly space the trains, such as shown, for example, in the Patent No. 2,082,436 granted to S. N. Wight, June 1, 1937.

If, however, it is required that the route be changed for one or more of a series of trains from the route originally designated, it is provided that, by actuation of an optional stick and non-stick control lever to a "stick" position, the signal can be made a "stick" signal; that is, when the signal is restored to stop upon the passage of a train, it can be cleared again only by a manual initiation of the transmission of controls from the control office to that field station for clearing that signal.

The provision of these two types of operation greatly facilitates the dispatching of trains by allowing an operator to select the field stations for which he wishes to clear signals by manual control, and allowing the remainder of the field stations to be governed by automatic signal control.

Although it is considered that, under most conditions encountered in practice, it is desirable to provide an optional stick and non-stick signal control lever for each field station, it is to be understood that one lever could as well be provided for a group of field stations, or for the entire system.

Other objects, purposes and characteristic features of the present invention will be in part obvious from the accompanying drawings and in part pointed out as the description of the invention progresses.

In describing the invention in detail, reference will be made to the accompanying drawings, in which like reference characters designate corresponding parts throughout the several views, in which parts of a similar nature are designated by reference characters including like letters with the reference characters being made distinctive by reason of different preceding numerals, and in which.

In order to simplify the description of the present invention, reference is made from time to time to features common to all parts of a similar nature by use of the letter reference characters without their preceding numerals. It is to be understood that such a reference applies to any parts designated in the drawings by reference characters that are similar except for numerals associated therewith.

The drawings have been made more for the purpose of facilitating the disclosure of the invention as to the principles involved and mode of operation, than for the purpose of illustrating the specific construction and arrangement of parts that would be employed in practice. Thus, circuits well known to those familiar with the art have merely been indicated by dotted lines rather than showing all the details of such circuits, and conventional illustrations have been employed representative of the various relays, contacts and battery terminals.

The symbols (+) and (−) are employed to indicate the positive and negative terminals respectively of suitable batteries or other sources of direct current; and the circuits with which those symbols are used always have current flowing in the same direction. If alternating current is used the symbols (+) and (−) are to be considered as representative of positive and negative instantaneous polarities.

As above mentioned, the present invention has been shown as applied to a communication system connecting a control office with several field stations as disclosed in the patent to Judge et al., Patent No. 2,082,544, dated June 1, 1937. To simplify the consideration of the present disclosure many parts and circuits shown in this patent have been omitted, but those parts and circuits of the Judge et al. patent, have been given the same reference characters as appear in the patent so that this disclosure may be readily considered with respect to the patent. Other relationships common with the patent disclosure will be mentioned in detail hereinafter.

The complete centralized traffic controlling system is assumed to include a control office and a plurality of field stations interconnected by a code type communication system shown in the above mentioned Judge et al. patent. Each field station includes only a portion of the whole track layout over which the traffic is governed by the centralized traffic controlling system.

Figure 3:
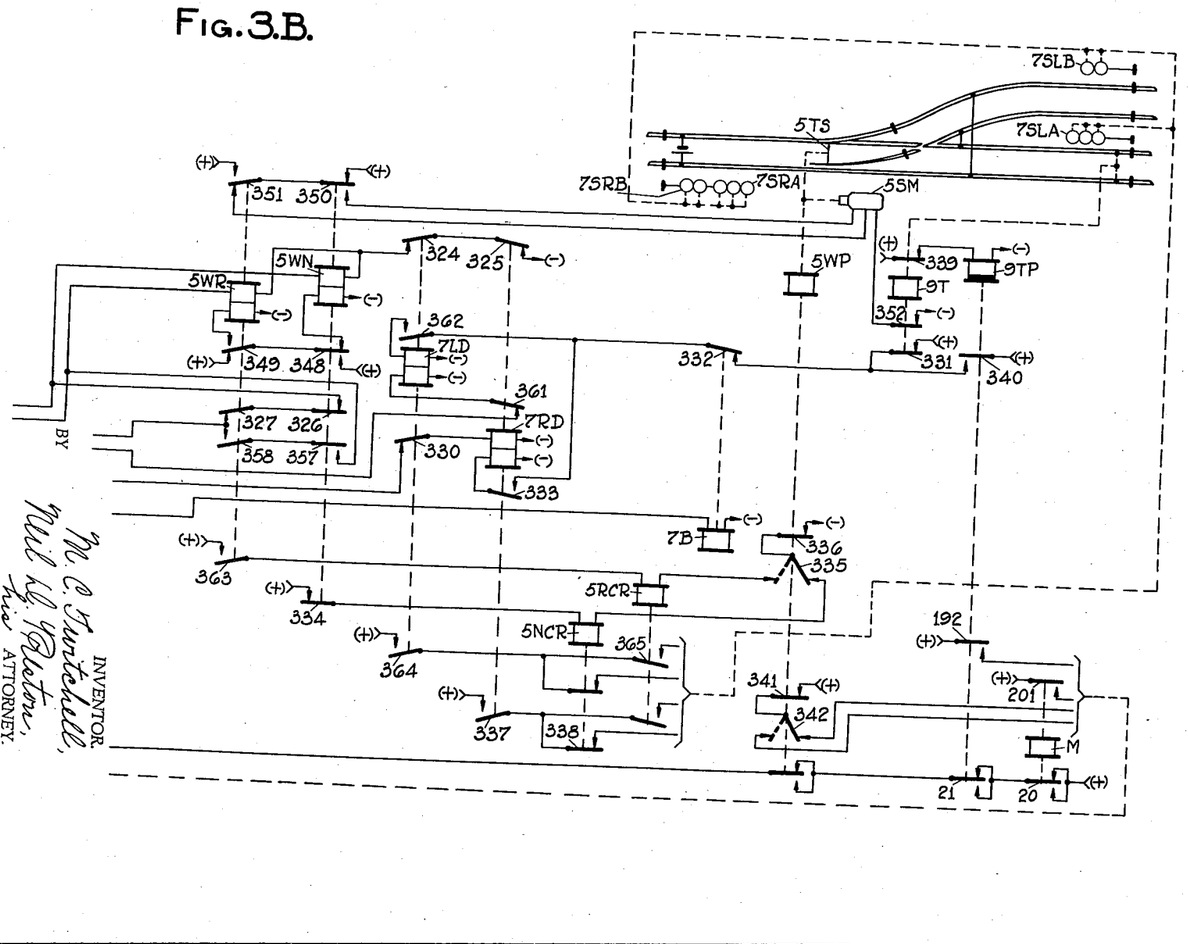
Figs. 3A and 3B when placed end-to-end illustrate a part of the code receiving apparatus employed at a field station.
Figure 3A:
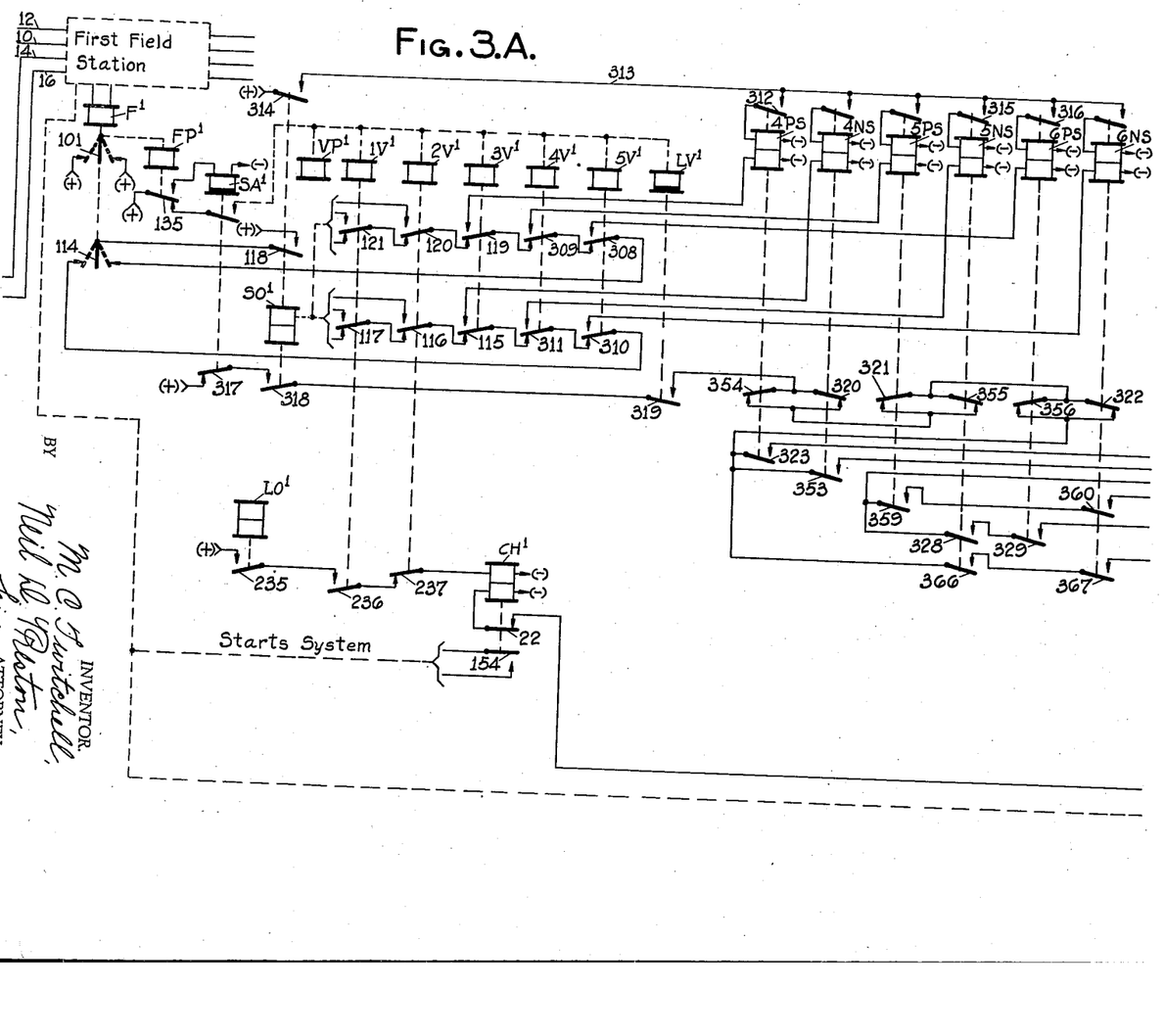

With reference to Figs. 3A and 3B, a portion of track layout is shown on the first field station as including a main track connected to a passing siding by the track switch 5TS. This track switch is assumed to be power operated by a switch machine 5SM which can be of any suitable type, such, for example, as shown in the patent to W. K. Howe, Patent No. 1,466,903 dated September 4, 1923. A switch position repeater relay of the polar-neutral type is associated with the track switch and switch machine so as to be energized with one polarity when the track switch is in a normal locked position and to be energized with the opposite polarity when the track switch is in the opposite locked position, but is deenergized whenever the track switch is unlocked or is in operation.

Signals 7SRA and 7SRB govern traffic to the right over the track switch 5TS in its opposite positions, while signals 7SLA and 7SLB govern traffic to the left over the track switch 5TS in its opposite positions.

A suitable detector track section is associated with the track switch 5TS and is provided with the track relay 9T and the usual track battery, it being understood that this detector track section or track circuit is suitably insulated from the other track circuits of the complete track layout. The track relay 9T has associated therewith a direct track repeater relay 9TP which is slightly slow acting.

The control office includes a control machine (see Fig. 1) which has a miniature track diagram of the complete track layout for the whole centralized traffic controlling system. For the purposes of the present disclosure, the track switch 5TS at the first field station has been shown in miniature by the miniature track switch 5ts together with another miniature track switch 6ts corresponding to a track switch 6TS for the opposite end of the siding located at another field station (not shown).

Figure 1:
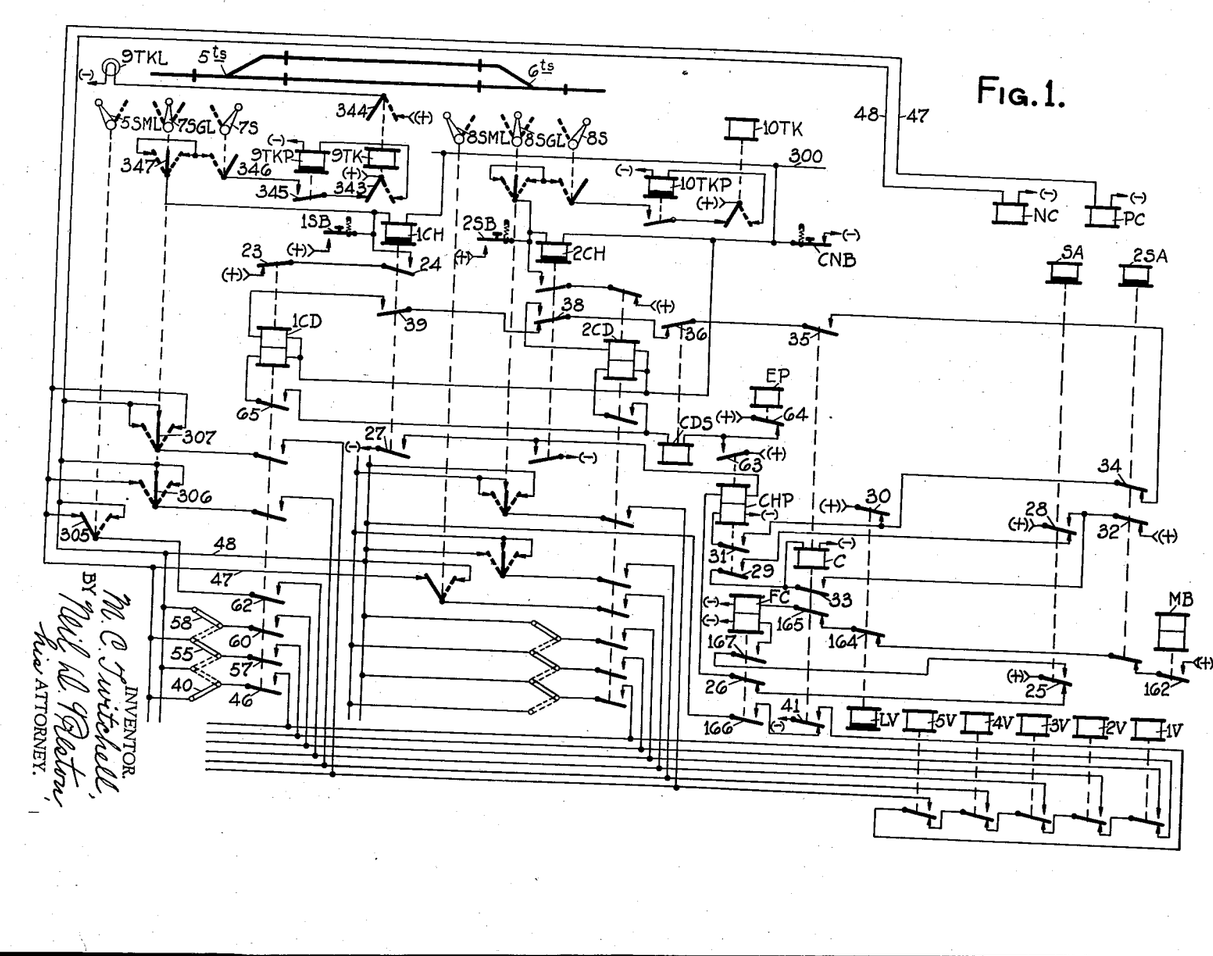
Fig. 1 illustrates that part of a control office transmitter associated with the control levers for the initiation of the system and for the selection of codes to be transmitted to select the desired field station.

The control machine includes switch machine control levers SML (with suitable preceding numerals), signal control levers SGL, and auxiliary levers S which select whether their associated signals are to be of the non-stick or stick type. For the purposes of the present invention, it is assumed that each field station includes a single track switch and its associated signals, so that each group of levers such as 5SML, 7SGL and 7S have associated therewith a starting button such as 1SB. The actuation of the starting button SB for any particular field station causes the communication system to be initiated into operation for the transmission of controls to its associated field station.

Figure 2:
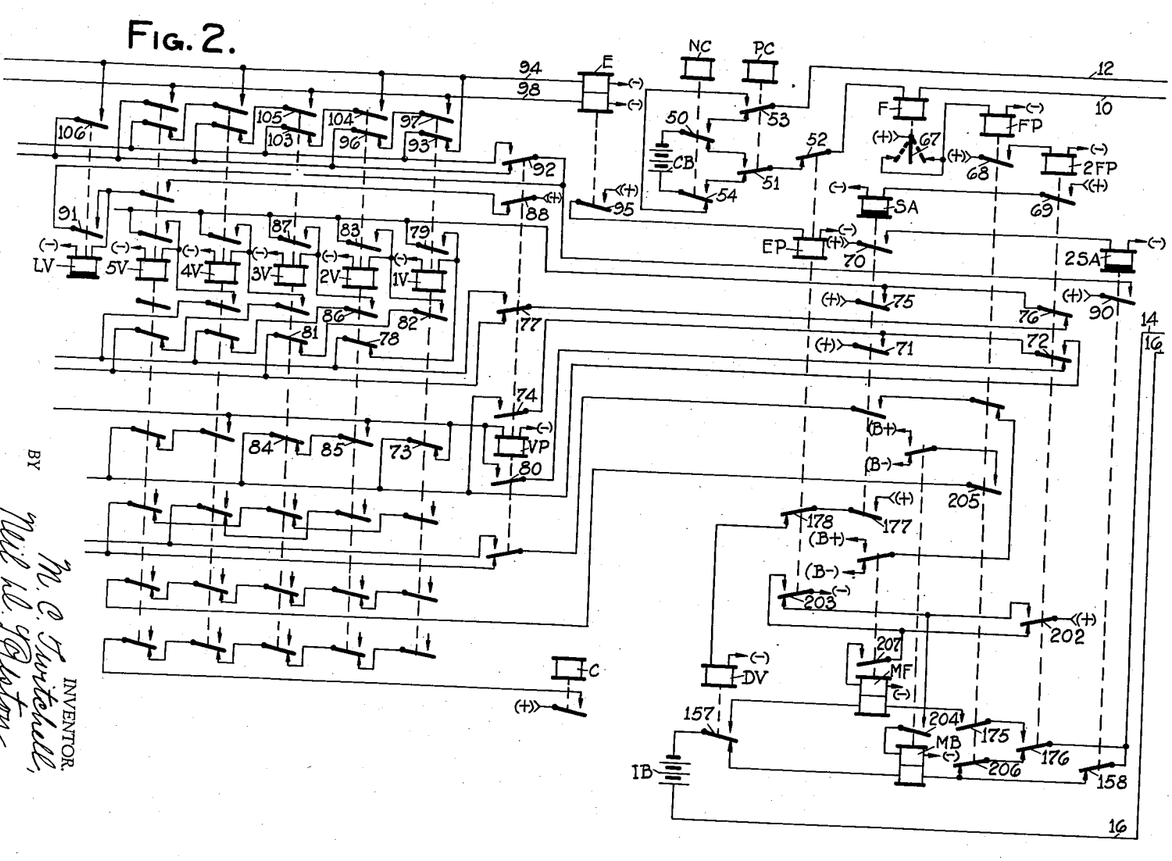
Fig. 2 illustrates the stepping and impulsing part of the code type communication system apparatus employed in the control office.

The control office includes the initiating and coding selecting apparatus of Fig. 1 and the transmitting and receiving apparatus of Fig. 2 having such relays as PC, NC, E, EP, F, FP, 2FP, SA, 2SA, C, FC, CDS, CHP, MF, MB, DV, VP, 1V, 2V, 3V, 4V, 5V and LV which operate in a manner disclosed in detail in the above mentioned Judge et al. Patent No. 2,028,544 dated June 1, 1937. Only a part of the code receiving apparatus for the control office has been shown, it being understood that the code receiving apparatus shown in Fig. 6 of the above mentioned patent is also to be provided. The provision of such apparatus would be in an identical manner to that shown in Fig. 6 of the patent except that five stepping relays V are used instead of the three shown, so that a greater number of indications as well as a greater number of controls can be transmitted than is shown in the patent. However, the operation is just the same so that it should be understood that the track indication relays TK of the present disclosure correspond to the indication relay 1RB of Fig. 6 of the patent.

These track indication relays TK are operated to the left by the reception of a track indication code indicating the associated track section in the field to be unoccupied and are operated to the right upon the reception of an indication code indicating that the associated track section in the field is occupied. For example, the relay 9TK corresponds to the track relay 9T of Fig. 3B. Each of the track indicator relays TK is provided with a suitable indicator lamp TKL and a directly controlled repeating relay TKP. While the indicator relays TK are of the two-position mag-stick type, the repeating relays are of the neutral slow acting type.

The relays CH are provided as a means for storing an initiating condition for the transmission of controls from the control office to the field stations, one CH relay being provided for each field station. Each relay CH is picked up in response to the actuation of the start button SB for that particular field station, or in response to a momentary energization effected by the relay TK in combination with the relay TKP for that field station when such station has a train pass its signals under non-stick control. As soon as a relay CH is picked up, it is maintained picked up through a stick circuit which is dependent for deenergization upon the initiation of a cycle of operation of the communication system for the transmission of controls to the field station with which it is associated.

A code determining relay CD is provided for each field station, and is responsive to the relay CH for that particular field station, only one relay CD being picked up at a time, to determine the particular field station to which controls are to be communicated. The relays CH provide means for storing starts designated by manual or automatic control, a plurality of starts being stored at one time, while the relays CD determine the particular order in which those starts are to be effective to transmit the controls to several field stations, the controls for only one field station being transmitted during any one cycle of operation.

At the field station, suitable code receiving and transmitting apparatus is provided similar to that shown in Fig. 3 of the above mentioned patent, except that five stepping relays V are employed instead of three. Also, the reception of the controls is provided for in accordance with the present invention which uses decoding relays such as, relays 4PS, 4NS, 5PS, 5NS, 6PS and 6NS for receiving the controls after that station is selected. At the completion of a cycle of operation upon which the relays PS and NS have been properly positioned, their positions are executed to the control relays which include switch control relays 5WN and 5WR and signal control relays 7LD, 7RD, and 7B. The relays LD and RD control the signals to the left and to the right respectively, while the relay B causes all signals to be restored to stop. A change relay CH at the field station accomplishes the initiation of the system for the transmission of indications, the same as in the patent.

The particular condition of the apparatus illustrated in the accompanying drawings is to be considered, for purpose of description, as the normal conditions of the system, that is, the track switch 5TS is in a normal position for through traffic on the main track, the track and track repeater relays shown in Fig. 3 are picked up, and the relay 5WN is maintained energized by a stick circuit closed from (+), through a circuit including back contact 349 of relay 5WR, front contact 348 of relay 5WN, and lower winding of relay 5WN, to (−).

All of the relays associated with the communication system are normally deenergized, and, at the control office, the switch control levers SML are assumed to be in their left-hand normal positions, the signal control levers SGL in their center-at-stop positions, and the auxiliary signal control levers S in their stick positions. The track indication relays TK are assumed to have last received indications that their track circuits were unoccupied to cause the polar contacts of those relays to be operated to left-hand positions.

Having thus considered the general organization of the system, it is believed that the mode of operation of the system provided by the present invention can best be understood by considering various typical conditions of operation.

*Operation*

Before considering the detailed operation of the system with respect to those features pertaining more particularly to the present invention, it is believed expedient to first give general consideration to the operation of the code communication part system.

The field stations and control office are interconnected by four line wires 10, 12, 14 and 16. The line wires 10 and 12 are connected together at the last field station in the system and are energized with positive and negative impulses from a control battery CB in the control office for the purpose of transmitting the controls and for the purpose of causing the synchronous step-by-step operation at the control office and at the several field stations.

At the control office, a series of stepping relays 1V, 2V, 3V, 4V, 5V and LV together with a half-step relay VP (see Figs. 1 and 2) operate step-by-step in response to the time space impulses impressed on the line circuit. Likewise at the field station a series of stepping relays $1V^1$, $2V^1$, $3V^1$, $4V^1$, $5V^1$ and $LV^1$ together with a half-step relay $VP^1$ (see Fig. 3A) operate step-by-step in response to the time space impulses impressed upon the line circuit. The stepping circuits for the stepping relays at the field station are very similar to those shown for the control office in Fig. 2. However, the detailed differences can be found in Fig. 3 of the above mentioned Judge et al patent.

The line wire 10 includes a three-position polar relay F (with suitable exponent) at the control office and at each field station, which relays repeat the impulses of each series. The particular polarity of the impulses of each series placed upon the control and stepping line circuit is applied by the polarity selecting relays PC and NC which apply positive or negative impulses respectively. These relays PC and NC are operated in accordance with the station code calls and the control to be transmitted as shown in Fig. 1 of the accompanying drawings, so that one or the other of these relays is energized for each step taken by the stepping relays in the control office. The duration of each impulse of a series, as well as the duration of the time spaces between such impulses is determined in accordance with the operation of impulsing relays E and EP which are operated in response to the operation of the stepping relays V together with the half-step relay VP (see Fig. 2).

At the control office, each impulse is repeated by the relays FP and 2FP irrespective of the polarity of such impulse. At the field station only a relay FP is provided.

A slow acting relay SA is provided at the control office and at each field station for marking off the different series of impulses by being picked up at the beginning of each series and by dropping at the end of each series. This is accomplished by providing that each relay SA is slow in picking up upon the first impulse of each series, but is relatively much slower in dropping away so as to maintain its front contacts closed during the time spaces between impulses in each series of impulses. At the control office the relay SA is provided with a repeater relay 2SA and at the field station a repeater relay SB (not shown) is usually provided but has not been shown in the present disclosure.

The relay 2FP in the control office directly operates the stepping relays V to take one step for each deenergization of the line circuit and to cause the relay VP to operate to an opposite position for each energization of the line circuit. It will be apparent that this operation is dependent upon the picking up of the relay SA which occurs upon the first impulse of a cycle of operation and is maintained through such cycle of operation so that the relays may be stuck up until the end of such cycle. At the field station similar operations occur but the stepping relays V are operated directly from the relay FP dependent upon the picking up of the relay SA and its repeater relay SB (not shown) and the closure of a front contact of the station selecting relay SO, or a front contact of the lock-out relay LO. These station relays will be mentioned more in detail hereinafter.

The indication line circuit comprising the line wires 14 and 16 is energized from an indication battery IB and has included therein at the control office, message receiving relays MF and MB which are respectively controlled through front and back contacts FP and 2FP, as well as front and back contacts respectively 157 of a dividing relay DV.

The indication line wire 14 extends to all field stations normally including a back contact of the lock-out relay LO at each of the field stations.

When a particular field station is transmitting, the lock-out relay LO at that station is picked up as well as the slow acting repeater relay SA and its repeating relay SB, (not shown) thereby rendering the opened or closed conductive condition of the indication line circuit dependent upon the control of either a relay PF or PB (not shown) in accordance with whether the stepping line circuit is energized or deenergized.

The pulsing relays PF and PB (not shown) are positioned on each step taken by the stepping relays V in accordance with the station code call assigned to that station and in accordance with the indications to be transmitted, such indications being illustrated in Fig. 3B as associated with a track repeating relay WP. The initiation of the system for the transmission of indications occurs upon the change in indication conditions by the dropping of a change relay CH which is restored after the system is once set into operation. In the control office suitable station registering relays are controlled by the relays MB and MF. After the selection of a station registering relay, the indications are transmitted so that the relays MF and MB control indication registering relays, of which relay 9TK has been shown for one station and relay 10TK has been shown for another station.

*Setting up route*

Let us assume that the operator desires to clear the signal 1SRA with the track switch 5TS set for main line traffic. To do this, the operator leaves the switch machine control lever 5SML in the normal position shown, actuates the signal control lever 7SGL to a right-hand position, and then depresses the starting button 1SB which causes the energization of the relay 1CH by a circuit closed from (+), through a circuit including the back point of push button 1SB, winding of relay 1CH, bus wire 300, front point of cancel button CNB, to (−). As soon as the relay 1CH picks up, a stick circuit is closed from (+), through a circuit including back contact 23 of relay 1CD, front contact 24 of relay 1CH, winding of relay 1CH, bus wire 300, front point of cancel button CNB, to (−). The picking up of relay 1CH causes the picking up of the relay CHP by reason of a circuit closed from (+), through a circuit including back contact 25 of relay SA, back contact 26 of relay FC, upper winding of relay CHP, front contact 27 of relay 1CH, to (−).

As soon as the relay CHP picks up a circuit is closed for picking up the relay C from (+), through a circuit including back contact 28 of relay SA, front contact 29 of relay CHP, winding of relay C, to (−). Relay C is stuck up by a circuit closed from (+), through a circuit including back contact 32 of relay 2SA, front contact 33 of relay C, windings of relay C to (−).

The picking up of the relay C closes a circuit which effects the picking up of the code determining relay 1CD by a circuit closed from (+), through a circuit including back contact 30 of relay LV, back contact 34 of relay 2SA, front contact 35 of relay C, back contact 36 of relay CDS, back contact 38 of relay 2CH, front contact 39 of relay 1CH, upper winding of relay 1CD, front point of cancel button CNB, to (−).

As soon as the relay 1CD is energized, its stick circuit is closed from (+), through back contact 64 of relay EP, winding of relay CDS, front contact 65 of relay 1CD, lower winding of relay 1CD, front point of cancel button CNB to (−). The relay CHP having been picked up also applies energy to this circuit through front contact 63. The energy which flows through this stick circuit also causes the relay CDS to pick up and open its back contact 36 thereby preventing the picking up of any subsequent relay CH from picking up its corresponding relay CD in the event its starting button SB should be operated.

The picking up of the relay 1CD opens its back contact 23 deenergizing the relay 1CH, but the relay 1CH is sufficiently slow acting in its release characteristics so as to remain picked up and close its front contact 39 for a sufficient period of time to assure the closure of the stick circuit for the relay 1CD.

The relay 1CD is maintained picked up throughout the cycle of operation for the transmission of controls to the field station selected by the code which it places upon the control line circuit, and it is dropped at the end of the cycle of operation by reason of the fact that the relay CHP is dropped by the opening of contact 39 upon the last step at which time the relay EP is picked up.

The picking up of the relay 1CD causes the first three impulses to be of characters in accordance with the code call assigned to a station as set up on the code jumpers 40, 55 and 58. As illustrated in Fig. 1 the code call assigned to the first station comprises impulses of (+), (+), (−). Thus, relay 1CD causes the system to transmit these successive impulses following which the impulses are determined by the position of the levers 5SML and 7SGL. Contact 305 of lever 5SML in a normal position applies energy through front contact 62 of relay 1CD during the third step to the bus wire for the relay PC so that the fourth impulse applied to the line circuit is positive (+). Similarly, the contacts 306 and 307 respectively, apply energy to the relays NC and PC during the fourth and fifth steps so that the fifth and sixth impulses are respectively (−) and (+). Further detailed description of the impulsing can be found in the above mentioned Patent No. 2,082,544.

With reference to Figs. 3A and 3B, it will be understood that at the beginning of the cycle of operation the relay SA¹ is picked up to allow the stepping relays V to operate in response to the impulsing on the line circuit. The code character of (+), (+), (−) causes the selection of this first field station by maintaining the relay SO¹ picked up in a manner described in detail in the above mentioned Judge et al. patent.

Thus, upon the taking of the third step and the application of the fourth impulse, the relay 4PS is picked up by a circuit closed from (+), through a circuit including front contact 118 of relay SO¹, polar contact 114 of relay F¹ in a right-hand position, back contact 308 of relay 5V¹, back contact 309 of relay 4V¹, front contact 119 of relay 3V¹, lower winding of relay 4PS, to (—). As soon as the relay 4PS is picked up, its front contact 312 connects its upper winding to a bus wire 313 which is supplied with energy through front contact 314 of relay SO¹.

With the fourth stepping relay 4V¹ picked up, the fifth impulse causes energy to be applied to the relay 5NS by a circuit closed from (+) through a circuit including front contact 118 of relay SO¹, polar contact 114 of relay F¹ in a left-hand position, back contact 310 of relay 5V¹, front contact 311 of relay 4V¹, lower winding of relay 5NS, to (—). The picking up of the relay 5NS closes its front contact 315 and connects its upper winding to the bus 313 which is supplied with energy as above mentioned.

On the fifth step, the sixth impulse causes the relay 6PS to be energized by reason of a circuit closed from (+), through a circuit including front contact 118 of relay SO¹, polar contact 114 of relay F¹ in a right-hand position, front contact 308 of relay 5V¹, lower winding of relay 6PS, to (—). As soon as relay 6PS picks up its front contact 316 connects its upper winding to the bus 313 which is supplied with energy as above mentioned.

At the end of the cycle of operation, that is, when the last stepping relay LV¹ has been picked up and the energy removed from the control line so that the cycle demarking relay SA¹ drops away, an executing circuit is closed from the decoding relays PS and NS to the control relays 5WN and 7RD during a short period of time measured by the drop away time of a repeater relay SA¹ and relays SO¹ and LV¹.

More specifically, a circuit is closed for the relay 5WN from (+), through a circuit including back contact 317 of relay SA¹, front contact 318 of relay SO¹, front contact 319 of relay LV¹, back contact 320 of relay 4NS, back contact 321 of relay 5PS, back contact 322 of relay 6NS, front contact 323 of relay 4PS, upper winding of relay 5WN, back contact 324 of relay 7LD, back contact 325 of relay 7RD, to (—).

The picked up condition of relay 5WN closes the normal operating circuit for the switch machine 5SM from (+), through a circuit including front contact 350 of relay 5WN, back contact 351 of relay 5WR, switch machine 5SM, front contact 352 of track relay 9T, to (—).

Inasmuch as the relay 5WN already assumed a picked up position by reason of a stick circuit including front contact 348 and back contact 349, an executing circuit is simultaneously completed for the relay 7RD from (+), through a circuit including back contact 317 of relay SA¹, front contact 318 of relay SO¹, front contact 319 of relay LV¹, back contact 320 of relay 4NS, back contact 321 of relay 5PS, back contact 322 of relay 6NS, front contact 323 of relay 4PS, front contact 326 of relay 5WN, back contact 327 of relay 5WR, front contact 328 of relay 5NS, front contact 329 of relay 6PS, back contact 330 of relay 7LD, upper winding of relay 7RD, to (—).

As soon as the relay 7RD is picked up, a stick circuit is completed from (+), through a circuit including front contact 331 of track relay 9T, front contact 332 of relay 7B, front contact 333 of relay 7RD, lower winding of relay 7RD, to (—).

On the other hand, if the relay 5WR had been picked up so that the execution of the control code for the normal relay 5WN must effect the dropping of relay 5WR, then the execution circuit for the relay 7RD is not completed until the relay 5WR is dropped away closing back contact 327, although the relay 5WN is picked up closing front contact 326. In other words, the relay 5WN is picked up to open the stick circuit for the relay 5WR and drop it away, but the execution circuit is not completed for a signal control relay until both the relays 5WR and 5WN are in positions corresponding to the positions required by the control code.

With the relay 5WN picked up, the correspondence relay 5NCR is energized with the track switch 5TS in its normal locked position by reason of a circuit closed from (+), through a circuit including front contact 334 of relay 5WN, winding of relay 5NCR, polar contact 335 of relay 5WP in a right-hand position, front contact 336 of relay 5WP, to (—).

Thus, as soon as the relay 7RD is picked up, with the relay 5NCR already energized, then a circuit is closed from (+), through a circuit including front contact 337 of relay 7RD and front contact 338 of relay 5NCR to clear the signal 7SRA.

*Passage of a train*

With the signal 7SRA cleared, the acceptance of this signal by a train causes the track relay 9T to be deenergized thereby opening its front contact 331 deenergizing the relay 7RD so that it drops away and remains deenergized although the opening of front contact 339 of track relay 9T also deenergizes its repeater relay 9TP and closes back contact 340. Thus, a subsequent control cycle can pick up the signal control relays and cause them to be stuck up even with a train on the detector track section.

The deenergization of the track repeating relay 9TP causes a shifting of its contact 21 from a front point to a back point. This momentary opening and closure of the contact 21 causes the change relay CH¹ to drop away closing its back contact 154. This initiates the system into a cycle of operation for the transmission of indications. As soon as the station is selected for transmitting its indications, the lock-out relay LO¹ is picked up, closing a pick-up circuit for the relay CH¹ upon the first step from (+), through a circuit including front contact 235 of lockout relay LO¹, front contact 236 of the stepping relay 1V¹, back contact 237 of the relay 2V¹, upper winding of the relay CH¹, to (—). In other words, the relay CH¹ is conditioned ready for another start upon a change in the indication conditions.

The indications thus transmitted are in accordance with the closed back contact 192 of the track repeating relay 9TP, the picked up condition of the relay M indicated by open back contact 201, and the contacts 341 and 342 of the switch position repeating relay 5WP.

Such transmission of the indications is effected as described in detail in the above mentioned Judge et al. patent. The closed condition of back contact 192 of the track repeating relay 9TP causes the operation of the polar contacts of the relay 9TK to right-hand positions. Polar contact 343 of relay 9TK in a right-hand position closes an energizing circuit for its repeater relay 9TKP which will be obvious from the drawings. Also, the closure of contact 344 in a right-hand position closes an obvious circuit for the indicator lamp 9TKL which advises the operator of the presence of the train.

When the train leaves the track section 9T, the shift of contacts 21 causes other initiation of the system and the transmission of an indication code causing the polar contacts of the relay 9TK to be operated to the left because the contact 192 of the relay 9TP is open. Such a control of the relay 9TK deenergizes the indicator lamp 9TKL and deenergizes the repeating relay 9TKP. This advises the operator that the train has left the detector track section.

Stick signal control

In the above described operation, it has been assumed that the lever 7S is in its normal position. Thus, the entrance of the train into the detector track section and deenergization of the relay 7RD restoring the signal 7SRA to stop causes the signal to remain at stop, and it will not again clear until the operator has manually positioned the control levers and actuated the start button 1SB. This may be done, however, any time after the train has entered the detector track section inasmuch as back contact 340 of the track repeating relay 9TP provides a stick circuit for the signal control relays a short time after the entrance of the train which remains closed upon the picking up of the track relay 9T. The passage of the train beyond the detector track section will then allow the operation of the switch machine 5SM and the subsequent clearing of the signal when the route is properly set up. It may be noted in this connection that the presence of a train on the detector track section 9 prevents the operation of the switch machine 5SM by the usual detector locking, shown conventionally as front contact 352 of relay 9T. However, it is to be understood that any usual detector and approach locking can be provided, as shown for example in the Patent No. 2,125,242 granted to E. C. Larry, et al., July 26, 1938. In other words, the positioning of the switch control relays 5WN and 5WR and the signal control relays 7LD and 7RD may be effected while the train is still on the detector track section so that a new route may be set up as soon as the train leaves the detector track section.

All of this operation to set up a second route is as a result of the manual starting of the system in the control office following the arrival of the indication of the presence of a train on the detector track section 9, so that the signal 7SRA is under such conditions purely a stick signal. This is of course true of all of the other signals.

Non-stick signal control

On the other hand, if the lever 7S is operated to its left-hand non-stick controlling position, the arrival of a train on the detector track section 9 and followed by its departure causes a momentary pick-up circuit to be closed for the relay 1CH from (+), through a circuit including polar contact 343 in a left-hand position, a front contact 345 of track repeating relay 9TKP, lever contact 346 in a left-hand operated position, signal lever contact 347 of lever 7SGL in either a right-hand or left-hand operated position, winding of relay 1CH, bus wire 300, front point of cancel button CNB, to (−). This momentary starting circuit is closed only momentarily because the relay 9TKP is picked up while the relay 9TK indicates the occupied condition of the detector track section and the circuit is closed through its front point only when the relay 9TK indicates the unoccupied condition of the track section. In other words, the circuit is closed only during the drop-away period of the relay 9TKP. The picking up of the relay 1CH effects the initiation of the system and the transmission of a control code in accordance with the then positions of the levers 5SML and 7SGL. Of course, if such levers are in the same positions as originally transmitted, then the track switch 5TS again receives its normal control and the signal 7SRA is cleared automatically.

In brief, with the lever 7S in its left-hand operated position, each time a train passes a signal, such as signal 7SRA, and then leaves the associated detector track section, another control code is automatically transmitted so that a following train can pass over the route thus set up, subject of course to the control provided by the associated block signal system (not shown).

Not only does this arrangement provide that a signal can be made optionally a stick or a non-stick signal, but it also provides that the operator can precondition the control levers for a new route. More specifically, when the operator has set up a particular route and cleared its signal by the transmission of a suitable control code, he can then move the switch and signal levers to new positions without operating the start button SB. When a first train has accepted the signal cleared for the particular route in response to the first control code and passed beyond the associated detector track section, another control code is automatically transmitted in accordance with the new positions of the control levers which causes a second route to be set up allowing the passage of a second train.

Such an arrangement is of particular advantage in providing for the meeting of two trains as for example, a train on the main track moving in an east-bound direction and a train in the passing siding moving in a west-bound direction. Assuming that the train on the main track has the superiority, then its route would be first lined up and its code transmitted by the actuation of the start button 1SB, then the route for the train on the siding could be lined up on the levers and when the train on the main track had passed over the detector track section a control code would be automatically transmitted to set up a route for the train on the passing siding to move off in a west-bound direction.

General features

In the above description, it was assumed that the fourth impulse of the cycle of operation (which is the first control impulse after the station selection impulses) was a positive impulse for controlling the track switch 5TS to a normal position. If the switch machine control lever 5SML is in a right-hand position for controlling the track switch 5TS to a reverse position, then such fourth impulse will be negative and cause the picking up of the relay 4NS at the field station on the third step in a manner obvious from the drawings. Thus, during the execution period a circuit will be closed for the relay 5WR including front contact 353 of the relay 4NS.

Also, it was assumed that the signal control lever 7SGL was operated to the right which caused the fifth and sixth impulses to be negative and positive respectively. However, if the signal control lever 7SGL is operated to the left for an operating cycle, these fifth and sixth impulses are positive and negative, respectively, causing the energization of the signal control relay 7LD during the executing period.

More specifically, let us assume that the lever 5SML is in a reverse controlling position and that the lever 7SGL is operated to the left followed by the operation of the starting button 1SB. After the station selecting impulses have been impressed upon the line circuit, the control impulses will be (—), (+), (—), so that during the execution period a circuit will be closed for the relay 5WR from (+), through a circuit including back contact 317 of relay SA$^1$, front contact 318 of relay SO$^1$, front contact 319 of relay LV$^1$, back contact 354 of relay 4PS, back contact 355 of relay 5NS, back contact 356 of relay 6PS, front contact 353 of relay 4NS, upper winding of relay 5WR, back contact 324 of relay 7LD, back contact 325 of relay 7RD, to (—).

During the same execution period as soon as the relay 5WR has picked up and the relay 5WN has dropped, an execution circuit is closed for the relay 7LD continuing from front contact 353 of relay 4NS, back contact 357 of relay 5WN, front contact 358 of relay 5WR, front contact 359 of relay 5PS, front contact 360 of relay 6NS, back contact 361 of relay 7RD, lower winding of relay 7LD, to (—). As soon as the contacts of the relay 7LD pick up, a stick circuit is closed including front contact 362 of relay 7LD, back contact 332 of relay 7B, and front contact 331 of track relay 9T.

As soon as the track switch 5TS has been operated to its reverse position by the switch machine 5SM, the correspondence relay 5RCR is energized through a circuit including front contact 363 of relay 5WR, windings of relay 5RCR, polar contact 335 of relay 5WP in a left-hand position, front contact 336 of relay 5WP, to (—).

Signal 7SLB is then cleared by circuit closed through front contact 364 of relay 7LD, and contact 365 of relay 5RCR.

Indications of the operation of the track switch and the clearing of the signal is of course transmitted to the control office in a manner described in detail in the above mentioned patent to Judge et al., Patent No. 2,082,544.

Whenever a signal is cleared, it can be manually put to stop by the operator by the return of the signal control lever SGL to a central stop position and followed by the actuation of the start button SB. For example, assuming the lever 7SGL to be returned to its stop position and the starting button 1SB to have been operated, a control code is transmitted in accordance with the normal or reverse position of the lever 5SML and includes impulses of negative character for both the fifth and sixth impulses. The positive and negative code receiving relays PS and NS will then be properly positioned so that during the execution period a circuit is closed for the stop relay 7B from (+), to a circuit including back contact 317 of relay SA$_1$, front contact 318 of relay SO$_1$, front contact 319 of relay LV$_1$, either back contact 320 or back contact 354 depending upon the character of the switch control, back contact 321 of relay 5PS, back contact 356 of relay 6PS, front contact 366 of relay 5NS, front contact 367 of relay 6NS, windings of relay 7B, to (—). The relay 7B is of course only energized during the execution period, but the opening of back contact 332 for such a period of time is sufficient to drop either the relay 7LD or the relay 7RD as the case may be and restore to stop conditions the particular signal which has been cleared.

Thus, a traffic control system has been provided in which the signal control is arranged to provide a signal of the stick or non-stick type as the operator may desire. This control is so provided that the signals are normally of the stick type and are restored to stop by the opening of contacts controlled by the train. Thus, any failure of the circuits results in the restoration of the signals to stop. The operation in which the signals are made non-stick includes the operation of the code type communication system and is effective only if an auxiliary lever has been manually operated. Thus, if the communication system fails to transmit a clearing code to cause the signal to be non-stick, then such failure is on the side of safety and the signal becomes a stick signal and holds the train until the operator performs some act to transmit a clearing code and allow the train to pass.

Having described a centralized traffic controlling system providing signals which may be made optionally stick and non-stick as one specific embodiment of the present invention, it is to be understood that this form is selected to facilitate in the disclosure of the invention rather than to limit the number of forms which the invention may assume; and it is to be further understood that various adaptations, limitations and modifications may be applied to the specific form shown in order to meet the requirements of practice without in any manner departing from the spirit or scope of the present invention.

What I claim is:

1. In a centralized traffic controlling system for railroads, a section of track having a track relay, a signal for governing traffic over said track section and controlled by said track relay, a signal control relay adjacent said signal for governing its clear and stop indications, manually operable signal control means in the control office having clear and stop conditions, a code transmitting system adapted when set into operation to transmit control codes to govern said signal control relay in the field in accordance with the condition of said signal control means in the control office, said code transmitting system also being adapted to transmit from the field to the control office distinctive indication codes of the occupied and unoccupied condition of said track section, means in the control office for manually initiating operation of said code transmitting system to send a signal control code to the field station to govern said signal control relay, a track indicator relay in the control office responsive to the reception of a track indication code to indicate the occupied or unoccupied condition of said track section, a slow acting repeater relay for said track indicator relay, and circuit means in the control office controlled by said track indicator relay and its slow acting repeater relay for at times automatically initiating operation of said code transmitting system to send a signal clearing control code in accordance with said manually operable signal control means in a clear condition upon the indicator relay indicating the unoccupied condition of said track section following an indication of the occupied condition of such section.

2. In a centralized traffic controlling system for railroads, a normally-at-rest code type communication system connecting a control office and a field station and effective to transmit controls and indications when set into operation, a section of track at the field station having a track circuit associated therewith and having a signal for governing traffic thereover, a neutral stick relay for clearing said signal when picked up, a pick-up circuit for said neutral stick relay momentarily energized upon the reception of a signal clearing code, a stick circuit for said neutral stick relay momentarily opened upon the entrance of a train into said track section, a signal control lever at the control office having clear and stop positions, manually governed means effective to set said communication system into operation to transmit a signal clearing code with said signal control lever in a clear position, a two-position track indicator relay at the control office responsive to an indication code to be operated to one position or the other depending upon the occupied or unoccupied condition of said track section, means at the field station effective to set said communication system into operation and transmit an indication code of the occupied or unoccupied condition of said track section whenever said track section becomes occupied or unoccupied respectively, a slow acting repeater relay directly controlled by said two-position track indicator relay, and circuit means at the control office for at times setting said communication system automatically into operation to transmit a signal clearing code with said signal lever in a clear position, said circuit means including a contact of said two-position track indicator relay closed in a position indicating the unoccupied condition of said track section and including a front contact of said slow acting repeater relay.

3. In a centralized traffic controlling system for railroads, a normally-at-rest code type communication system connecting a control office and a field station and effective to transmit controls and indications when set into operation, a section of track at the field station having a track relay which is effective to initiate said communication system into operation upon said section becoming occupied or unoccupied to thereby transmit a track indication code of the occupied unoccupied condition of said track section, a signal governing traffic over said track section, means responsive to a signal control code transmitted over said communication system for governing the clear and stop condition of said signal, said means also being governed by said track section so as to always be returned to stop upon the entrance of a train into such section and remain at stop until operated in response to another signal control code transmitted over said communication system, a signal control lever in the control office having clear and stop positions, manually operable means for initiating said system into operation to transmit a signal clear or stop control code in accordance with the clear or stop position of said signal lever, a two-position track indicator relay at the control office responsive to an occupied or unoccupied indication code to indicate the occupied or unoccupied condition of said associated track section, a slow acting relay energized whenever said track indicator relay indicates said track section to be occupied, and a circuit for automatically initiating said system into operation when said two-position track indicator relay is operated to indicate the unoccupied condition of said track section if said signal lever is in clear position, said circuit including a contact of said track indicator relay operated to indicate an unoccupied condition and including a front contact of said slow acting repeater relay.

4. In a centralized traffic controlling system for railroads, a normally-at-rest code type communication system connecting a control office and a field station and effective to transmit controls and indications when initiated into operation, a track switch at the field station having an associated detector track section, a signal for governing traffic over said track switch, a neutral stick relay for clearing said signal when picked up, a pick-up circuit for said neutral stick relay momentarily energized upon the reception of a signal clearing code, a stick circuit for said neutral stick relay including a front contact of a track relay associated with said detector track section and a back contact of a repeater track relay, a signal control lever in the control office having clear and stop positions, manually operable means effective to set said code communication system into operation to transmit a signal control code in accordance with the position of said signal control lever, a track indicator relay at the control office of the two-position magnetic-stick type operated to one position upon the reception of a track occupied indication code and operated to the opposite position upon the reception of a track unoccupied indication code, a slow acting neutral repeater relay for said track indicator relay energized whenever such indicator relay is in a position to indicate the occupied condition of said detector track section, and an auxiliary control lever associated with said signal and effective when operated to render available an automatic starting circuit, said automatic starting circuit including a contact of said track indicator relay closed when such relay indicates the unoccupied condition of said detector track section and a front contact of its slow acting repeater relay as well as contacts closed by said signal lever in a signal clear position.

5. In a centralized traffic controlling system for railroads, a field station having a section of railway track, a normally-at-rest code type communication system connecting a control office with said field station and effective to transmit controls or indications when set into operation, a track relay included in a track circuit formed by said section of track, means controlled by said track relay so as to be effective to initiate said communication system into operation whenever said section becomes occupied or unoccupied thereby transmitting an indication code of the occupied or unoccupied condition of said track section, a signal governing traffic over said track section, means responsive to a signal control code transmitted over said communication system for governing the clear and stop condition of said signal, said means also being governed by said track relay so as to always be returned to stop upon the entrance of a train into such section and remain at stop until operated in response to another control code transmitted over said communication system, a signal control lever in the control office having clear and stop positions, manually operable means for initiating said system into operation to transmit a signal clear or stop control code in accordance with the clear or stop position of said signal lever respectively, a two-position track indicator relay at the control office responsive to an occupied or unoccupied indication code to indicate the occupied or unoccupied condition of said associated track section, a slow acting relay, a circuit for energizing said slow acting relay whenever said track indicator relay indicates said track section to be occupied, an auxiliary control lever, and a circuit for automatically initiating said system into operation when said two-position track indicator relay is operated to indicate the unoccupied condition of said track section if said signal lever is in a clear position and said auxiliary lever is in an operated position, said circuit including a contact of said track indicator relay operated to indicate an unoccupied condition and including a front contact of said slow acting repeater relay, whereby said signal can be made to be a stick signal or a non-stick signal depending upon whether said auxiliary lever is unoperated or operated.

6. In a centralized traffic controlling system for railroads, a field station having a track switch and signal for governing traffic thereover, a detector track section associated with said track switch, a normally-at-rest code type communication system connecting a control office with said field station and effective to transmit controls or indications when initiated into operation, said communication system being capable of transmitting controls for said track switch and signal on the same cycle of operation, a neutral stick relay for clearing said signal when picked up, a pick-up circuit for said neutral stick relay momentarily energized upon the reception of a signal clearing code, a stick circuit for said neutral stick relay including a front contact for said track relay associated with said track section, a signal control lever in the control office having clear and stop positions, a switch control lever in the control office having normal and reverse positions, manually operable means at the control office effective to set said communication system into operation to transmit a control code in accordance with the positions of said switch and signal control levers, relay means at the field station responsive to the reception of a switch control code for operating said track switch to normal or reverse positions in accordance with the code transmitted, a track indicator relay at the control office of the two-position type operated to one position upon the reception of a track occupied indication code and operated to the opposite position upon the reception of a track unoccupied indication code, a slow acting repeater relay for said track indicator relay energized whenever said indicator relay is in a position to indicate the occupied condition of said detector track section, and an auxiliary control lever associated with said signal and effective when operated to render available an automatic starting circuit, said automatic starting circuit including a contact of said indicator relay closed when such relay indicates the unoccupied condition of said detector track section and including a front contact of its slow acting repeater relay as well as contacts closed by said signal lever in a signal clear position, whereby the departure of a train from said detector track sections effects the transmission of a switch and signal control code to thereby operate the track switch to the same or a different position and to clear a signal after a train has passed over the detector track section in response to the first clearing of a signal.

7. In a coded centralized traffic controlling system for railroads in which a control office and a field station are interconnected by a communication system, a track layout at the field station having a track switch and a signal, manually operable contact means at the control office having distinctive operating positions for selecting controls to be transmitted by the communication system for governing said track switch and said signal, a detector track section for said track switch, means for indicating the condition of occupancy of said track section in the control office, circuit means at the control office for at times automatically effecting the transmission of controls for operating said track switch and clearing said signal when there is a change in the condition of occupancy of said detector track section, the transmission of such controls being effective for clearing said signal irrespective of the controls for that signal last transmitted.

8. In a signal control system of the character described, a track section, a signal for governing the movement of traffic into said track section, a track circuit for said track section including a track relay, a neutral relay when picked up clearing said signal and including a stick circuit including a front contact of said track relay, a pick-up circuit for said neutral relay, means manually controlled for momentarily closing said pick-up circuit to energize and stick up said neutral relay to clear said signal until said track circuit becomes occupied, automatic means effective to momentarily close said pick-up circuit when said track relay picks up in response to unoccupancy of said track circuit, and manually operable means for rendering said automatic means ineffective.

9. In a centralized traffic controlling system, the combination with an office and a field station; a communication system including line wires connecting said office and said field station, a first normally-at-rest code transmitting means at said office and a first normally-at-rest code receiving means at said station for transmitting codes from said office to said field station over said line wires, a second normally-at-rest code transmitting means at said field station and a second normally-at-rest code receiving means at said office for transmitting codes from said field station to said office over said line wires; a signal lever at said office; a first manually operable contact at said office; a second manually operable contact at said office having a stick and a non-stick position; a track occupancy relay at said office; a signal at said field station; a signal relay at said field station having a stick circuit including its own front contact and for when energized clearing said signal; a track relay included in a track circuit directly ahead of said signal; means effective upon movement of said signal lever to its signal clearing position and momentary closure of said first manually operable contact for causing said first code transmitting means to transmit a code to said first code receiving means to energize said signal relay; contacts controlled by said track relay effective for a time to interrupt said stick circuit upon deenergization of said track relay; contacts controlled by said track relay effective to cause said second code transmitting means to transmit a code to said second code receiving means to cause said traffic relay to assume its track occupied or its track unoccupied position upon each operation of said track relay; and means effective only when said second manually operable contact is in its non-stick position and upon actuation of said track relay from its track occupied position to its track unoccupied position to cause said first code transmitting means to transmit a repeat signal clearing code to said first code receiving means to cause a second energization of said signal relay and a second clearing of said signal providing said signal lever is still in said signal clearing position.

10. In a centralized traffic controlling system for railroads, a normally-at-rest code type communication system connecting a control office and a field station and effective to transmit controls and indications when set into operation, a section of track at the field station having a track relay which is effective to initiate said communication system into operation upon said section becoming occupied or unoccupied to thereby transmit a track indication code of the occupied or unoccupied condition of said track section, a signal governing traffic over said track section, means responsive to a signal control code transmitted over said communication system for governing the clear and stop condition of said signal, said means also being governed by said track section so as to always be returned to stop upon the entrance of a train into such section and remain at stop until operated in response to another signal control code transmitted over said communication system, a signal control lever in the control office having clear and stop positions, manually operable means for initiating said system into operation to transmit a signal clear or stop control code in accordance with the clear or stop position of said signal lever, a two-position track indicator relay at the control office responsive to an occupied or unoccupied indication code to indicate the occupied or unoccupied condition of said associated track section, and a circuit for automatically initiating said system into operation including a contact closed when said two-position track indicator relay is operated to indicate the unoccupied condition of said track section and including a contact closed if said signal lever is in a clear position.

11. In a centralized traffic controlling system for railroads, a normally-at-rest code type communication system connecting a control office and a field station and effective to transmit controls and indications when set into operation, a section of track at the field station having a track relay which is effective to initiate said communication system into operation upon said section becoming occupied or unoccupied to thereby transmit a track indication code of the occupied or unoccupied condition of said track section, a signal governing traffic over said track section, means responsive to a signal control code transmitted over said communication system for governing the clear and stop condition of said signal, said means also being governed by said track section so as to always be returned to stop upon the entrance of a train into such section and remain at stop until operated in response to another signal control code transmitted over said communication system, a signal control lever in the control office having clear and stop positions, manually operable means for initiating said system into operation to transmit a signal clear or stop control code in accordance with the clear or stop position of said signal lever, a two-position track indicator relay at the control office responsive to an occupied or unoccupied indication code to indicate the occupied or unoccupied condition of said associated track section, a circuit for automatically initiating said system into operation including a contact closed when said two-position track indicator relay is operated to indicate the unoccupied condition of said track section and including a contact closed if said signal lever is in a clear position, and manually operable means for rendering said circuit ineffective.

12. In a centralized traffic controlling system for railroads, a normally-at-rest code type communication system connecting a control office and a field station and effective to transmit controls and indications when initiated into operation, a track switch at the field station having an associated detector track section, a signal for governing traffic over said track switch, a neutral stick relay for clearing said signal when picked up, a pick-up circuit for said neutral stick relay momentarily energized upon the reception of a signal clearing code, a stick circuit for said neutral stick relay including in multiple a front contact of a track relay associated with said detector track section and a back contact of a repeater track relay, a signal control lever in the control office having clear and stop positions, manually operable means effective to set said code communication system into operation to transmit a signal control code in accordance with the position of said signal control lever, a track indicator relay at the control office operated to one position upon the reception of a track occupied indication code and operated to the opposite position upon the reception of a track unoccupied indication code, an automatic starting circuit, and an auxiliary control lever in said office and effective when in its operated position to render available said automatic starting circuit, said automatic starting circuit including a contact of said track indicator relay closed when such relay indicates the unoccupied condition of said detector track section.

13. In a centralized traffic controlling system for railroads, a normally-at-rest code type communication system connecting a control office and a field station and effective to transmit controls and indications when initiated into operation, a track section at said field location, a signal for governing traffic over said track section, a neutral stick relay for clearing said signal when picked up, a pick-up circuit for said neutral stick relay momentarily energized upon the reception of a signal clearing code, a stick circuit for said neutral stick relay including in multiple a front contact of a track relay associated with said track section and a back contact of its associated repeater track relay, a signal control lever in the control office having clear and stop positions, manually operable means effective if operated to close a starting circuit to set said code communication system into operation to transmit a signal control code in accordance with the position of said signal control lever, a track indicator relay means at the control office operated to close one contact upon the reception of a track occupied indication code and to close another contact upon the reception of a track unoccupied indication code, an automatic starting circuit, and an auxiliary control lever in said office and effective when in its operated position to close said automatic starting circuit at one point, said automatic starting circuit including said another contact of said track indicator relay means, whereby said neutral relay is picked up to clear said signal after each occupancy of said track section so long as said signal lever is in its clear condition and said auxiliary control lever is in its operated position.

14. The combination with a normally-at-rest type code communicating system in which the transmission of controls and indications is only momentary and connecting the control office and a field station, of a track section at said field station, a signal for governing traffic over said section, a neutral stick relay for when energized clearing said signal, a pick-up circuit for said stick relay closed momentarily upon the reception of a signal clearing code, a signal control lever at said office capable of assuming a clear and a stop position, a manually controlled starting circuit which if closed when said signal control lever is in its clear position causes said code communicating system to transmit a clearing code to said field station, a stick circuit for said stick relay including in multiple a front contact of a track relay of a track circuit for said section and a back contact of its associated repeater relay, a manually operable lever having a stick and a non-stick position, track circuit occupancy indicating means at said office controlled over said communication system in accordance with the condition of said track relay for indicating the condition of occupancy of said track section, and an automatically controlled starting circuit closed to cause said code communicating system to transmit a clearing code when said signal control lever assumes a clear position, said manually controlled lever assumes a non-stick position and said track circuit occupancy indicating means changes from indicating occupancy to indicating non-ocupancy of said track section.

MORTON C. TWITCHELL.